(12) United States Patent
Cuypers et al.

(10) Patent No.: US 8,876,372 B2
(45) Date of Patent: Nov. 4, 2014

(54) SENSOR ARRANGEMENT FOR TEMPERATURE MEASUREMENT AND METHOD FOR MEASUREMENT

(75) Inventors: Jan Cuypers, Kermt (BE); Valère Indeherberge, Zonhoven (BE)

(73) Assignee: Heraeus Electro-Nite International N.V., Houthalen (BE)

( * ) Notice: Subject to any disclaimer, the term of this patent is extended or adjusted under 35 U.S.C. 154(b) by 179 days.

(21) Appl. No.: 13/107,173

(22) Filed: May 13, 2011

(65) Prior Publication Data

US 2011/0280278 A1 Nov. 17, 2011

(30) Foreign Application Priority Data

May 17, 2010 (DE) .......................... 10 2010 020 715

(51) Int. Cl.
| | | |
|---|---|---|
| *G01K 1/00* | (2006.01) | |
| *G01J 5/00* | (2006.01) | |
| *G01J 5/08* | (2006.01) | |
| *G01J 5/04* | (2006.01) | |

(52) U.S. Cl.
CPC .................. *G01J 5/041* (2013.01); *G01J 5/046* (2013.01); *G01J 5/08* (2013.01); *G01J 5/0821* (2013.01); *G01J 5/048* (2013.01); *G01J 5/0887* (2013.01)
USPC .............................. 374/139; 374/131; 374/208

(58) Field of Classification Search
USPC .......................................... 374/139, 131, 208
See application file for complete search history.

(56) References Cited

U.S. PATENT DOCUMENTS

| | | | |
|---|---|---|---|
| 4,355,907 A | | 10/1982 | Orths et al. |
| 4,427,263 A | * | 1/1984 | Lagakos et al. ............... 385/128 |
| 5,456,761 A | * | 10/1995 | Auger et al. .................. 136/232 |
| 5,585,914 A | * | 12/1996 | Yamasaki et al. .............. 356/44 |
| 6,004,031 A | | 12/1999 | Takayama et al. |
| 7,197,199 B2 | | 3/2007 | Cuypers et al. |
| 2005/0175065 A1 | * | 8/2005 | Coleman ........................ 374/139 |
| 2006/0012088 A1 | * | 1/2006 | Whitaker et al. ............... 266/87 |
| 2006/0114967 A1 | * | 6/2006 | Dams et al. .................... 374/139 |
| 2007/0268477 A1 | * | 11/2007 | Dams et al. ...................... 356/43 |
| 2010/0020845 A1 | * | 1/2010 | Dams et al. .................... 374/139 |
| 2013/0243031 A1 | * | 9/2013 | Kendall et al. ................. 374/139 |
| 2013/0322489 A1 | * | 12/2013 | Cuypers et al. ............... 374/159 |

FOREIGN PATENT DOCUMENTS

| | | |
|---|---|---|
| CN | 2465162 Y | 12/2001 |
| DE | 1930565 U | 1/1966 |
| DE | 2929693 B1 | 9/1980 |
| DE | 4433685 C2 | 2/1997 |
| DE | 103 31 125 B3 | 9/2004 |
| DE | 10331124 B3 | 2/2005 |
| EP | 1034419 B1 | 4/2007 |
| JP | 7229791 A | 8/1995 |

OTHER PUBLICATIONS

EP Search Report issued Sep. 28, 2011 in EP Application No. 11003584.7.

(Continued)

*Primary Examiner* — Mirellys Jagan
(74) *Attorney, Agent, or Firm* — Panitch Schwarze Belisario & Nadel LLP (57) ABSTRACT

A sensor arrangement is provided for temperature measurement in melts, in particular in metal or cryolite melts having a melting point above 600° C., using a temperature sensor. A method for the measurement with this sensor arrangement is also provided.

12 Claims, 7 Drawing Sheets

(56) References Cited

OTHER PUBLICATIONS

EP Office Action issued Dec. 14, 2011 in EP Application No. 11003584.7.
Stöcker, "Taschbuch der Physik," Harri Deustch, Frankfurt am Main, pp. 565, 589 (1994).
Office Action issued Feb. 22, 2012 in AU Application No. 2011202054.
Office Action issued Dec. 10, 2010 in DE Application No. 10 2010 020 715.2-52.
English translation of a Search Report and Office Action dated Jul. 17, 2013 in CN Application No. 2011101279386.

* cited by examiner

A
SENSOR ARRANGEMENT FOR TEMPERATURE MEASUREMENT AND METHOD FOR MEASUREMENT

BACKGROUND OF THE INVENTION

The invention relates to a sensor arrangement for temperature measurement in molten masses, in particular in metal or cryolite melts having a melting point above 600° C., comprising a container having an opening on its top side in which a temperature sensor is arranged. The invention also relates to a method for measurement with such a sensor arrangement. Such measurement devices and sensor arrangements are known, for example, from German Patent DE 44 33 685 C2. Described there is a thermoelement arranged on a carrier body. This thermoelement projects into a container in which the cooling temperature of the melt is measured. Additional sensor arrangements for the measurement of temperatures in melts are known from German Patent DE 103 31 124 B3, wherein optical fibers are used as the sensor element. In European Patent EP 1 034 419 B1 a sensor arrangement is described that uses a thermoelement, similar to DE 44 33 685 C2. Another temperature sensor is known, for example, from Japanese patent application publication (kokai) JP 07 229 791 A. Here, measurements are performed with an optical fiber, which receives the radiation from the melt and forwards it to an evaluation unit, in which the temperature is determined in a known way from the received radiation.

BRIEF SUMMARY OF THE INVENTION

The object of the present invention is to improve existing devices and, in particular, to provide a sensor arrangement with which a quick and accurate measurement is possible for measurements in cryolite melts.

The object is achieved for sensor arrangements of the type described at the outset, wherein the temperature sensor has a tube, which projects into the container and in which an optical fiber is arranged, which optionally has a jacket tube contacting its jacket surface, and wherein the tube or the jacket tube is closed on its end arranged in the container. Because the temperature sensor has such a tube, the advantageous properties of the measurement can, on one hand, be used with optical fibers and, on the other hand, the optical fiber is adequately protected from damage, because it is arranged in a gas-tight, closed tube.

According to one embodiment, the optical fiber can be arranged along its entire length in an inner, conventional, metal protective tube (jacket tube). This surrounds the optical fiber in a close-fitting manner, in order to prevent an optical fiber from breaking, e.g., when it bends. The container can be used, for example, for liquidus measurements, in which it is initially immersed in the melt and filled with this melt, and after being pulled from the melt the solidification curve or the temperature profile during the solidification is measured with the help of the optical fiber. Among other things, in order to prevent undercooling of the melt to be analyzed, the container can be connected rigidly to a vibrator. In practice, the container can be arranged on a carrier, which is suitable, in turn, for immersion in the melt and is immersed in the melt by a lance. The lance can be a known vibration lance, in order to realize vibration of the container.

It has proven advantageous that the tube is formed either
a) from steel, in particular from stainless steel, and has a heat capacity of at most 155 m²KμW⁻¹, in particular between 3.5 and 153 m²KμW⁻¹ or
b) from copper and has a heat capacity of at most 6 m²KμW⁻¹, in particular between 0.1 and 5.1 m²KμW⁻¹ or
c) from quartz glass and has a heat capacity of at most 205 m²KμW⁻¹, in particular between 5.0 and 202.1 m²KμW⁻¹.

According to one embodiment, the tube can be formed, in particular, from a copper alloy. By the special design of the tube to the temperature of the melt, it is guaranteed and simultaneously ensured that the tube emits the radiation sufficiently well, so that the optical fiber can receive it with high accuracy. For protection from being destroyed in the melt, the tube can advantageously be coated, in particular with copper or molybdenum or with a ceramic, in particular with aluminum oxide.

The tube expediently has an outer diameter of at most 5 mm; the wall thickness of the tube preferably equals at most 2 mm. In this way, on one hand, the necessary stability is guaranteed and, on the other hand, the heat can be optimally received and emitted as radiation. The closed end of the tube has, in particular, a spacing of 0.1 to 5 mm, preferably approximately 3 mm from the floor of the container, in order to achieve high measurement accuracy. With a preferred pinched tube end, it has been shown that a ratio of the remaining, open cross-sectional area in the pinched interior of the tube to the length of the pinched tube portion (measured in the longitudinal direction of the tube) equals <0.5 mm, in particular optimally approximately 0.05 mm.

In another aspect, the invention further comprises a sensor arrangement for temperature measurement in melts, in particular in metal or cryolite melts having a melting point above 600° C., with a temperature sensor having an immersion end. The arrangement is characterized in that the temperature sensor has a tube in which an optical fiber is arranged, which optionally has a jacket tube contacting its jacket surface, wherein the tube or the jacket tube is closed on its end arranged in the container. The tube can be closed in various ways. In principle, in the sense of each of the described sensor arrangements, a closed tube is a tube in which the immersion end is closed gas-tight, whereby the optical fiber is protected. The tube can thus be compressed or fused together at its end. The optical fiber can be arranged along its entire length in an inner, conventional metal protective tube (jacket tube). This surrounds the optical fiber in a close-fitting manner, in order to prevent the optical fiber from breaking, e.g., when it bends.

It is advantageous for this second sensor arrangement that the temperature of the melt can be determined with a simple arrangement. This sensor arrangement can also expediently be connected rigidly to a vibrator, wherein the vibrator can be arranged, as already described above, on a known vibration lance. The vibration lance receives a carrier tube for the temperature sensor, wherein the temperature sensor is preferably arranged on the end of the carrier tube.

The sensor arrangement is characterized, in particular, in that the tube is formed either
a) from steel, in particular from stainless steel, and has a heat capacity of at most 155 m²KμW⁻¹, in particular between 3.5 and 153 m²KμW⁻¹ or
b) from copper and has a heat capacity of at most 6 m²KμW⁻¹, in particular between 0.1 and 5.1 m²KμW⁻¹ or
c) from quartz glass and has a heat capacity of at most 205 m²KμW⁻¹, in particular between 5.0 and 202.1 m²KμW⁻¹.

In this arrangement, the tube is preferably also formed from a copper alloy; it can be coated with a protective layer made of, for example, copper or molybdenum or a ceramic, in particular of aluminum oxide. This tube advantageously has an outer diameter of at most 5 mm and a wall thickness of at most 2 mm. Here also, for a preferably pinched tube end, it has also been shown that a ratio of the remaining, open cross-sectional area in the pinched interior of the tube to the length of the pinched tube portion (measured in the longitudinal direction of the tube) equals <0.5 mm, in particular optimally approximately 0.05 mm.

The previously described sensor arrangements can be used, in particular, for temperature measurements in melts having a melting point of more than 600° C., in particular in steel or cryolite melts.

The method according to the invention for measurement with a sensor arrangement described above is characterized in that the immersion end of the sensor arrangement arranged on a carrier lance is immersed in the melt, then at least the immersed part of the tube is heated to a temperature between 350° C. and 800° C., after reaching this heating temperature the optical fiber is pushed into the tube, and a vibration of the tube is begun, and finally the temperature of the melt is measured. Advantageously, the sensor device is then pulled from the melt and detached from the carrier lance, and the end of the optical fiber is removed. Upon removal of the end of the optical fiber, this can be fed back into the tube and used again for temperature measurement, without negatively affecting the quality of the measurement by a destruction of the optical fiber due to the temperature.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
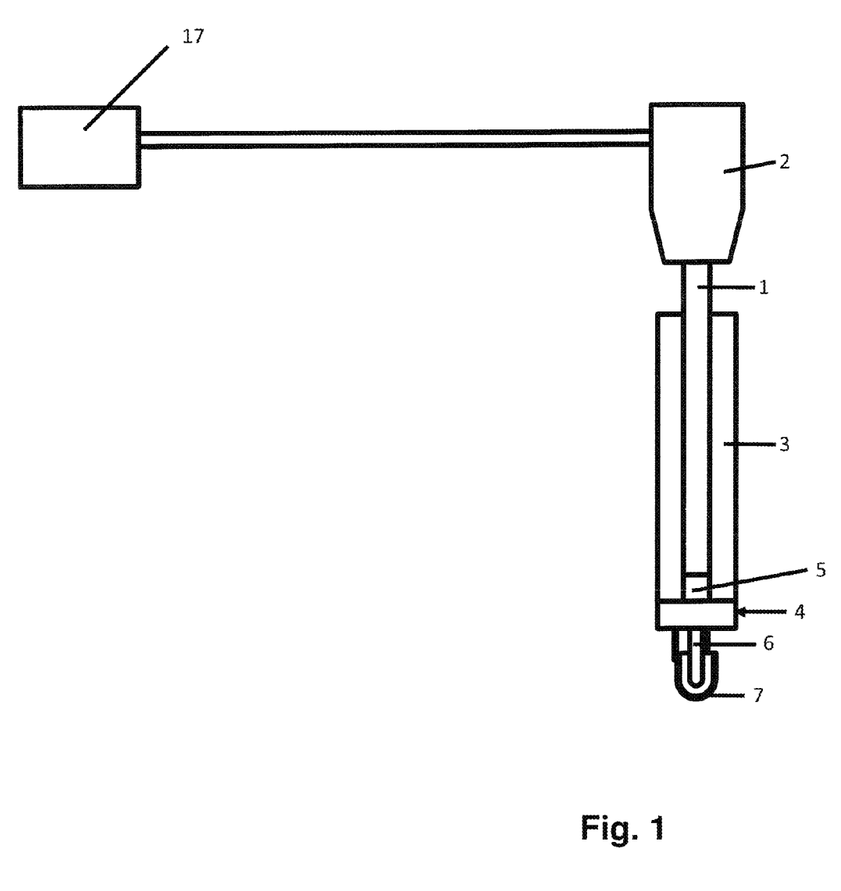
FIG. 1 is a schematic representation of an embodiment of a device having a sensor arrangement according to the invention.
Figure 2:
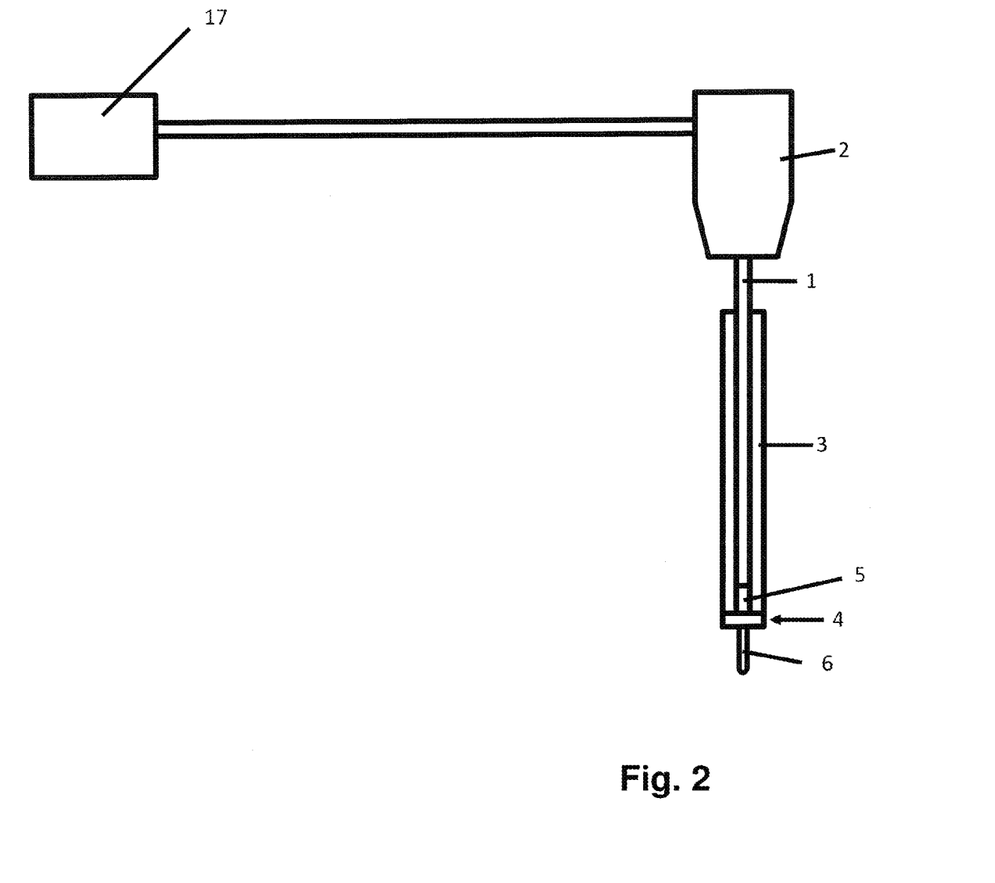
FIG. 2 is a schematic representation of an analogous device to FIG. 1 according to another embodiment of the invention having an additional sensor arrangement.

The device shown in FIGS. 1 and 2 comprises a carrier lance 1, which is connected via a vibrator 2 to a fiber advance device 17 and furthermore to a not-shown control unit, and which is inserted into a carrier tube 3 formed from paperboard for the sensor arrangement 4 and is connected at its lower end to a coupling 5 of the sensor arrangement 4. The vibrator 2 transmits a vibration to the sensor arrangement 4 via the carrier lance 1 and the coupling 5. In addition, the arrangement contains a fiber advance device 17 for feeding the optical fiber into the tube 6 of the sensor arrangement 4. FIGS. 1 and 2 show different embodiments of the sensor arrangement 4, wherein in FIG. 1 the tube 6 projects into a container 7, so that this arrangement can be used for determining melting points and solidification points, while the arrangement according to FIG. 2 is used for pure temperature measurement.

Figure 3A:
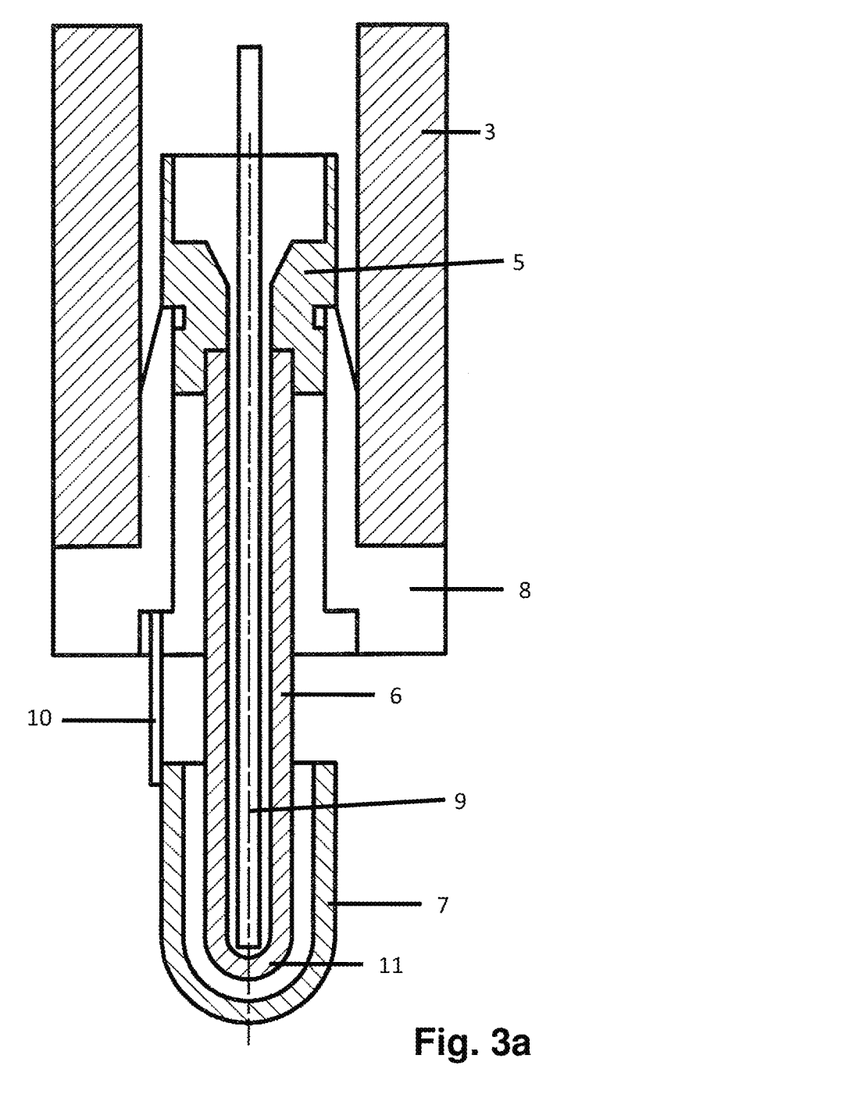
FIGS. 3a and 3b are cross-sectional views of sensor arrangements according to embodiments of the invention.

FIG. 3a shows details of the sensor arrangement 4 according to FIG. 1. It can be seen here that a measurement head 8 is arranged on the end side of the carrier tube 3 placed in the immersion direction of the device. The measurement head 8 is preferably formed from ceramic, but can also be formed from cement, metal, or molding sand or a combination of several of these materials. The coupling 5 is fixed on the rear end of the measurement head arranged in the interior of the carrier tube 3. The tube 6 is arranged on the immersion end of the coupling 5, and the optical fiber 9 is arranged, in turn, in the tube 6.

The optical fiber 9 is formed from quartz glass, which has a jacket tube made of steel as an outer layer contacting its jacket surface in a close-fitting manner, with this jacket tube serving for protection of the quartz glass from mechanical damage. The optical fiber 9 is arranged to be movable in the tube 6. The tube 6 is formed from stainless steel and has a heat capacity between 3.5 and 135 $m^2K\mu W^{-1}$. The tube 6 can also be formed from copper and can have a heat capacity between 0.1 and 5.1 $m^2K\mu W^{-1}$ or from quartz glass, wherein it has a heat capacity between 5.0 and 202.1 $m^2K\mu W^{-1}$. The tube 6 has an outer diameter of at most 4 mm and a wall thickness of at most 1 mm. It projects into the container 7, which is formed from steel.

Figure 3B:
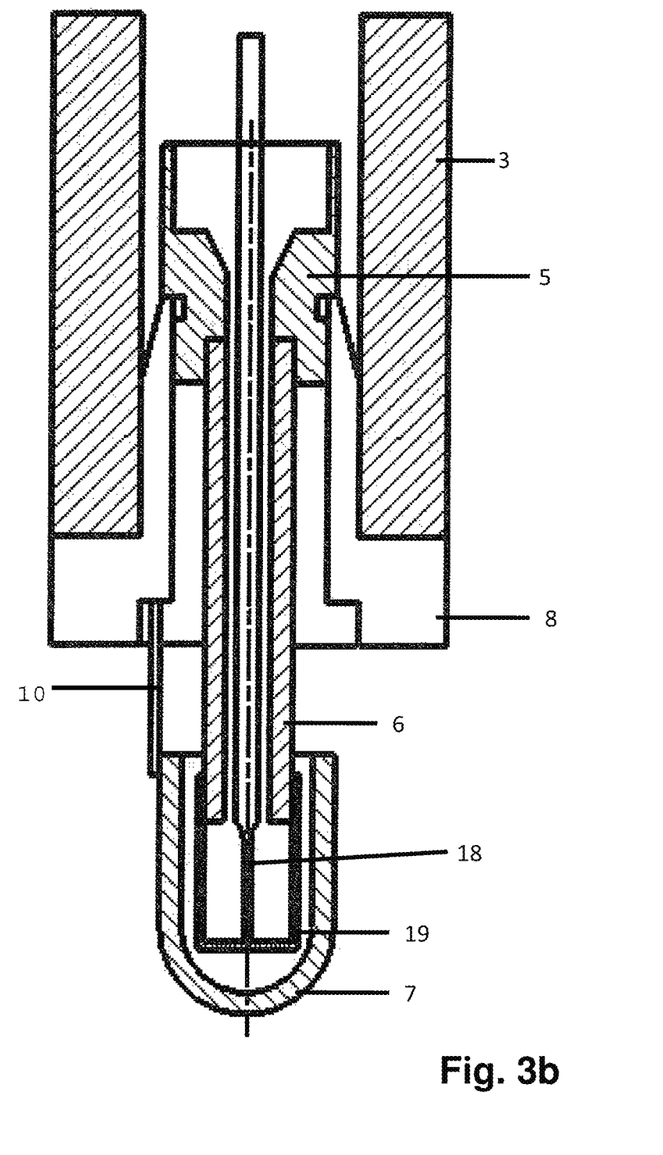

FIG. 3b shows a similar arrangement, wherein the tube 6' is open on its immersion end. For this purpose, the jacket tube of the optical fiber 9 is closed at its immersion end 18 by a pinching. On the immersion end of the tube 6', a metal strip is arranged as a stop 19 with a U-shape, up to which the pinched end of the jacket tube of the optical fiber 9 is pushed and thus serves for the positioning of the end of the optical fiber 9 in the container 7.

The container 7 is fixed on the measurement head 8 by steel braces 10. It has a volume of, in general, approximately between 2 and 6 $cm^3$, in particular approximately 4 $cm^3$, whereby its inner height equals approximately 28 mm and its inner diameter equals approximately 14 mm. On its bottom side the container is rounded. The spacing of the lower end of the tube 6 from the floor of the container 7 equals approximately 3 mm.

The tube 6 according to FIG. 3a is closed gas-tight on its lower end 11. The gas-tight closure can be realized by a pinching of the tube 6 or by a fusing together of the front end of the tube, e.g., in the form of a hemisphere. In this way, an absolute seal is not required, it is sufficient if the melt in which measurements are to be performed, thus for example a cryolite or steel melt, cannot attack the optical fiber 9. In the case of a pinched tube end or jacket tube end, it has been shown that a ratio of the remaining open cross-sectional area in the pinched tube interior to the length of the pinched tube portion of the tube 6 or the jacket tube of the optical fiber 9 (measured in the longitudinal direction of the tube) equals <0.5 mm, in particular optimally approximately 0.05 mm.

The closure thus can also be realized directly on the optical fiber, that is, by a closure of the jacket tube (steel tube) surrounding the quartz glass (FIG. 3b). By means of the closed lower end 11 of the tube 6, it is guaranteed that the optical fiber 9 is brought into the optimal position for the measurement. Namely, it can be pushed into the tube 6 up to the closed lower end 11 (or up to the stop 19 according to FIG. 3b) until it impacts there and is thus arranged in the optimal position within the container 7, that is, in its so-called thermal center.

Figure 4:
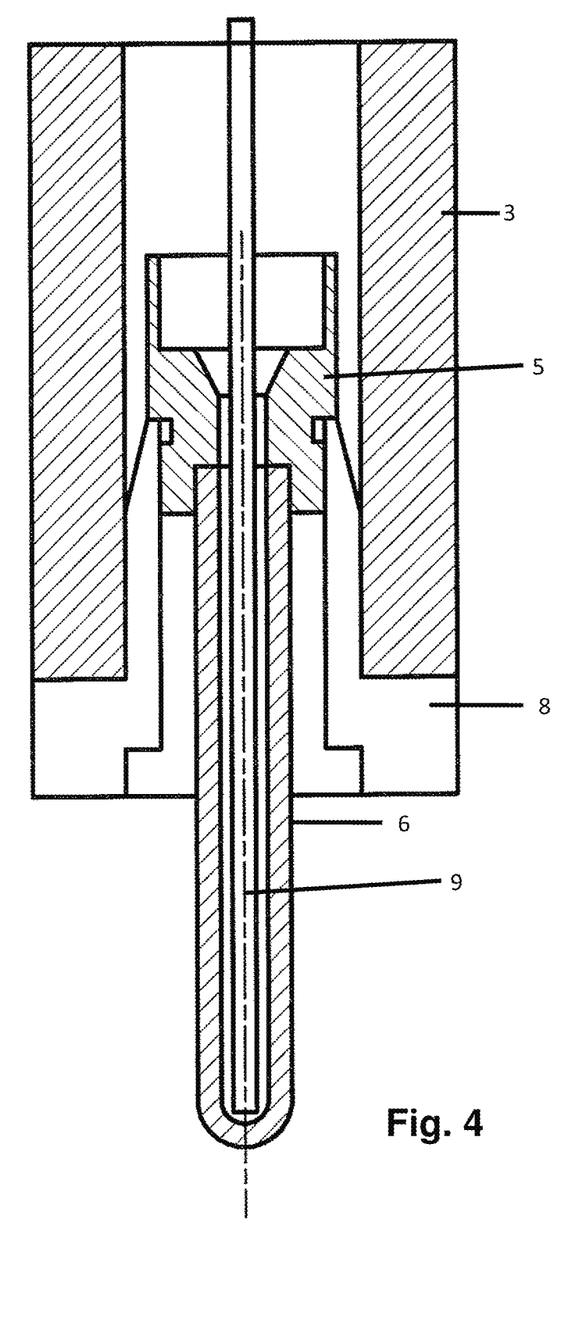
FIG. 4 is a cross-sectional view of an additional sensor arrangement according to an embodiment of the invention.

The sensor arrangement shown in FIG. 4 shows a configuration that is principally the same as in FIGS. 3a, 3b, but wherein the tube 6 with the optical fiber 9 is not arranged in a container 7, so that it serves for the temperature measurement within the molten bath, but cannot be used for the determination of a heating or cooling curve, as is possible with an arrangement of an optical fiber 9 within a container 7 according to FIG. 3a or 3b. Such a container 7 can be filled with the melt to be measured in a known way through immersion in a melt container and then pulled out, whereby the measurement of the cooling curve is performed. By a re-immersion, the heating curve can be optionally measured.

Figure 5A:
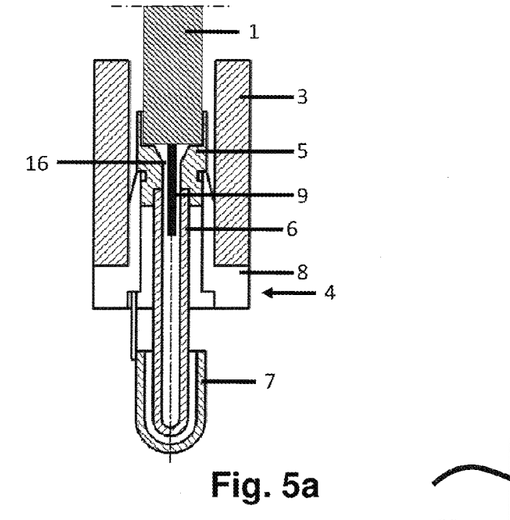
FIGS. 5a, 5b and 5c are representations of steps of a processing sequence according an embodiment of the measurement method of the invention.
Figure 5B:
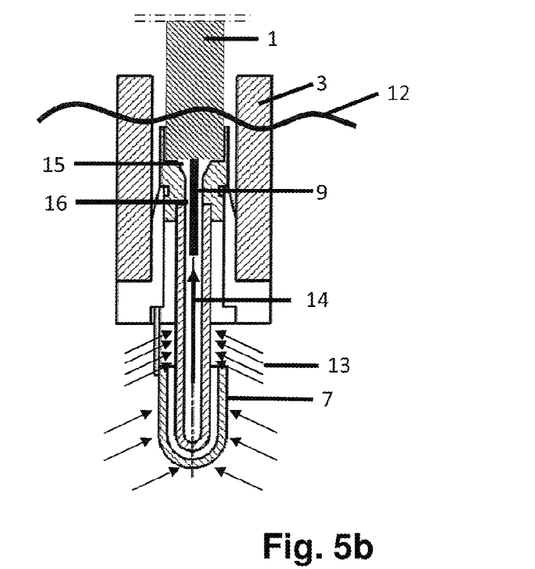
Figure 5C:
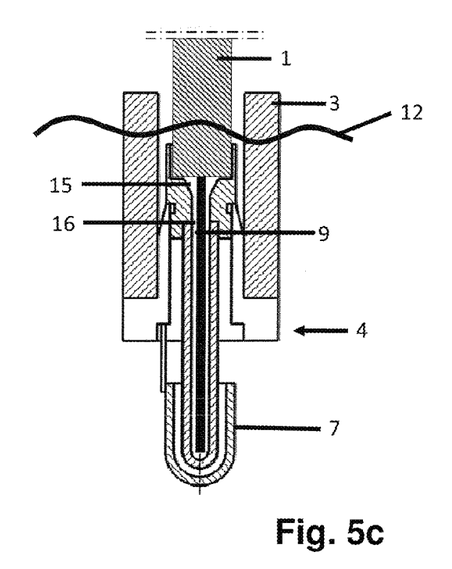

FIGS. 5a-5c show a measurement with a so-called self-controlling mechanism, in which the fiber advance is performed automatically. Another temperature sensor for the determination of the time sequence of the fiber advance is not needed. The measurement cycle is started after the sensor arrangement with the carrier tube 3 is arranged on the carrier lance 1. The sensor arrangement 4 with the measurement head 8 arranged on the carrier tube 3 is thus immersed into the melt, so that at least the container 7 and the end side of the measurement head 8 facing the container 7 is immersed in the melt. In this way, as shown in FIG. 5a, the optical fiber 9 is located in its starting position.

After immersion of the sensor arrangement 4 in the melt, the bath level 12 of the melt is arranged above the measurement head 8 (FIGS. 5b, 5c). Around the closed end of the tube 6, the temperature increases, heat radiation 13 acts on the tube 6, and a portion 14 of the radiation is received by the optical fiber 9. At this time, this is still spaced approximately 50 mm away from the melt, but close enough to measure a temperature between approximately 270° C. and approximately 800° C. After reaching a temperature of approximately 500° C., a signal is output from the control unit to the vibrator 2 for the start of the vibration. Simultaneously, a signal is sent to the advance mechanism 17 for the optical fiber, so that its immersion end is guided within less than 10 seconds, preferably within approximately 2-3 seconds, to the closed end of the tube 6 and is then located in the measurement position (FIG. 5c).

Up to this point, the process runs without intervention of an operator. Then the measurement of the bath temperature is performed, after which the carrier lance 1 with the sensor arrangement 4 is pulled from the melt, so that the portion of the melt remaining in the container 7 begins to solidify and the solidification temperature is measured. A signal initiates this process of removal and another signal indicates the end of the measurement of the cooling curve. This signal can be controlled by either time or temperature. After that, an operator removes the sensor arrangement 4 with the carrier tube 3 from the measurement lance 1, whereby an approximately 60 mm long end of the optical fiber 9 projects from the carrier lance 1. This end is cut off, whereby an approximately 10 mm long end of the optical fiber remains, which is then open on its immersion end, that is, not covered by a surrounding steel jacket.

Then, a new sensor arrangement 4 having a new carrier tube 3 is placed on the carrier lance 1. The approximately 10 mm long end of the optical fiber is arranged centrally relative to the coupling, whose passage begins with a conical opening 15, so that the optical fiber 9 is led without problem through the central, axially-symmetric opening 16 of the coupling 5 into the tube 6. A new measurement process can begin. This automated process leads to a reduction of operator-caused error sources, for example because the measurement process and the advance of the optical fiber 9 are automated.

Figures 6A, 6B, 6C:
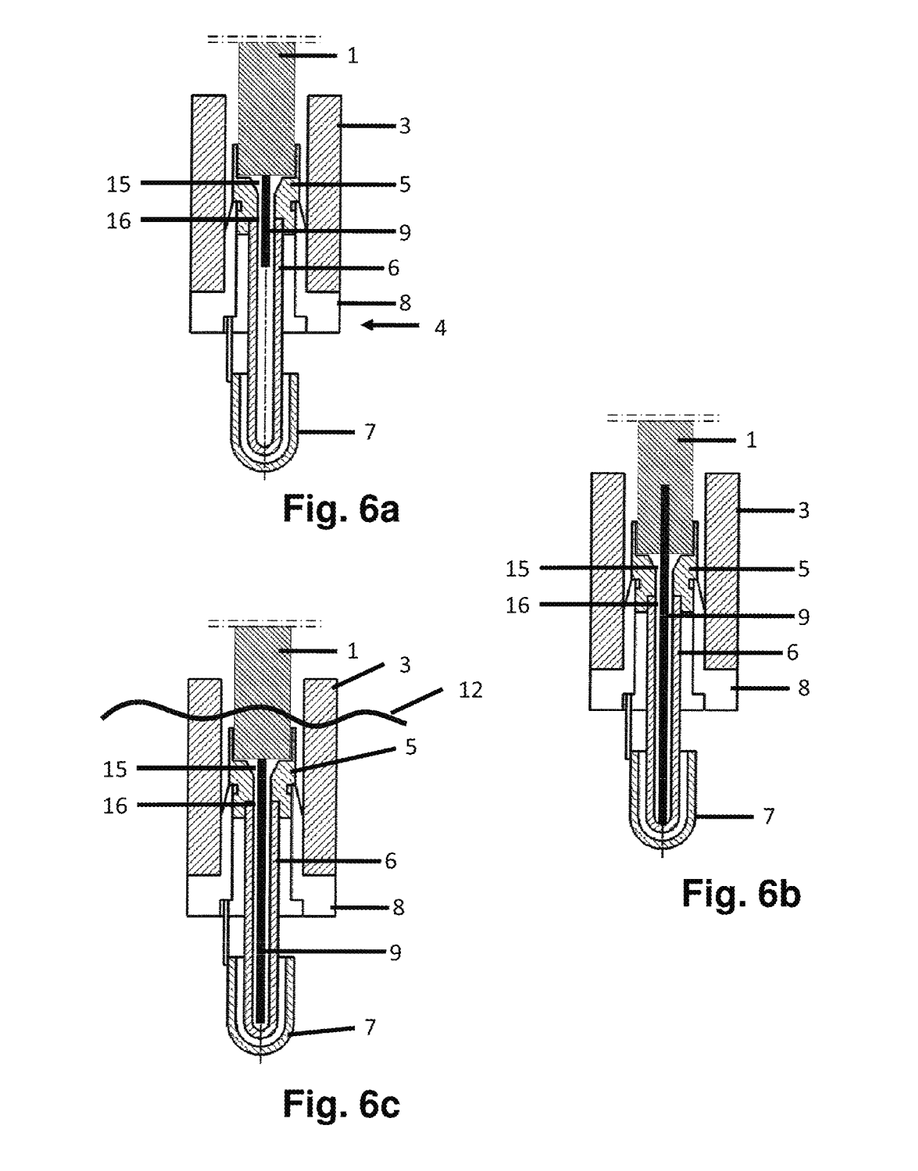
FIGS. 6a, 6b and 6c are representations of steps of an alternative processing sequence according to the invention.

In FIGS. 6a-6c, a similar, manually controlled process is shown. The starting situation (FIG. 6a) is the same as for the automatic procedure (cf. FIG. 5a). The operator presses a push button, which activates a timer/time switch for the advance mechanism 17. This brings the optical fiber 9 in less than 10 seconds, ideally in approximately 2-3 seconds, into the measurement position (FIG. 6b).

Then, the immersion mechanism is triggered. Here, the carrier lance 1 is moved in the direction of the melt for measurement, until the measurement head 8 is arranged underneath the bath level 12. The temperature radiation acts on the optical fiber 9. When a temperature of approximately 500° C. is measured, the vibration is started by the control unit 2. After subsequent measurements of the bath temperature, a signal tone sounds, the lance is pulled upward, so that the container 7 comes out of the melt and cools with the melt that remains in it and is to be measured, so that the cooling curve can be measured. The end of this measurement is, in turn, signaled. Here, either acoustic or light signals can be used. The exchange of the sensor arrangement 4 with the carrier tube 3 is performed as described above for FIGS. 5a-5c.

The vibration takes place in the two described cases both on the container 7 and also on the tube 6, whereby the vibration itself is transmitted via the carrier lance 1. The vibration takes place at a frequency between 20 and 1000 Hz, optimally between 60 and 400 Hz, in particular at approximately 260 Hz. The amplitude lies between 0.01 and 0.5 mm, optimally between 0.05 and 0.25 mm, and can lie, in particular, at 0.145 mm. It is regulated by the control unit and can be adapted to the respective type of sensor arrangement.

The cutting of the optical fiber 9 can take place manually or with an electric knife, for example a rotary blade, or in some other way.

If a quartz glass fiber surrounded on its jacket surface with a metal layer (a jacket tube) has an open end on its end side, that is an end which is not covered with metal and which is in direct contact with a cryolite melt, this will degrade or be destroyed very quickly, which leads to measurement errors. If such a fiber is exposed to no vibration, this leads to a slower (normal) destruction of the fiber and to an accurate measurement of the temperature.

In principle, the bath temperature can thus be measured very accurately, but the liquidus temperature, that is the transition from liquid to solid or the transition from solid to liquid, cannot be so measured, because the destruction of the fiber is too slow for this purpose, so that the so-called liquidus curve cannot be measured exactly. Thus, it is advantageous to expose the optical fiber 9 to a vibration for improving the measurement results of the cooling or heating curve, in order to measure the so-called liquidus temperature.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A sensor arrangement for temperature measurement in melts, the sensor arrangement comprising:
   a container configured to be immersed in a melt and having an opening on its top side; and
   a temperature sensor arranged in the container, the temperature sensor having:
   a tube projecting into the container, the tube having a closed end arranged in the container,
   an optical fiber movably arranged in the tube, and
   a jacket contacting an outer surface of the optical fiber.

2. The sensor arrangement according to claim 1, wherein the container is connected rigidly to a vibrator.

3. The sensor arrangement according to claim 1, wherein the tube comprises a copper alloy.

4. The sensor arrangement according to claim 1, wherein the tube has a coating selected from copper, molybdenum and ceramic, optionally aluminum oxide.

5. The sensor arrangement according to claim 1, wherein the tube has a maximum outer diameter of 5 mm.

6. The sensor arrangement according to claim 1, wherein the tube has a maximum wall thickness of 2 mm.

7. The sensor arrangement according to claim 1, wherein the closed end of the tube is spaced 0.1 to 5 mm from a floor of the container.

8. The sensor arrangement according to claim 1, wherein the closed end of the tube is formed by a pinched portion, and wherein a ratio of a remaining, open interior cross-sectional area of the pinched portion of the tube to a length of the pinched portion equals <0.5 mm.

9. The sensor arrangement according to claim 1, wherein the tube is formed from either:
   a) steel and has a heat capacity of at most 155 $m^2K\mu W^{-1}$; or
   b) copper and has a heat capacity of at most 6 $m^2K\mu W^{-1}$; or
   c) quartz glass and has a heat capacity of at most 205 $m^2K\mu W^{-1}$.

10. The sensor arrangement according to claim 9, wherein the tube is formed from either:
   a) stainless steel and has a heat capacity of between 3.5 and 153 $m^2K\mu W^{-1}$; or
   b) copper and has a heat capacity of between 0.1 and 5.1 $m^2K\mu W^{-1}$; or
   c) quartz glass and has a heat capacity of between 5.0 and 202.1 $m^2K\mu W^{-1}$.

11. A method for temperature measurement in melts having a melting point of more than 600° C., the method comprising:
   immersing an immersion end of the sensor arrangement according to claim 1 in a melt, the sensor arrangement being arranged on a carrier lance, an immersion end of the optical fiber being moved up to the closed end of the tube,
   heating at least an immersed portion of the tube of the sensor arrangement to a temperature between 350 and 800° C., and
   after reaching this heating temperature, measuring the temperature of the melt.

12. The method according to claim 11, further comprising after measuring the temperature, pulling the sensor arrangement out of the melt, detaching the sensor arrangement from the carrier lance and removing the immersion end of the optical fiber.

* * * * *